(12) United States Patent
Contreras et al.

(10) Patent No.: US 10,609,169 B1
(45) Date of Patent: Mar. 31, 2020

(54) SYSTEMS AND METHODS FOR ENSURING PRESENTATION OF IN-APPLICATION MESSAGES

(71) Applicant: Braze, Inc., New York, NY (US)

(72) Inventors: Julian Contreras, New York, NY (US); Jared Poelman, Long Island, NY (US)

(73) Assignee: Braze, Inc., New York, NY (US)

( * ) Notice: Subject to any disclaimer, the term of this patent is extended or adjusted under 35 U.S.C. 154(b) by 0 days.

(21) Appl. No.: 16/445,793

(22) Filed: Jun. 19, 2019

(51) Int. Cl.
    *H04L 29/08* (2006.01)

(52) U.S. Cl.
    CPC .............. *H04L 67/26* (2013.01); *H04L 67/32* (2013.01)

(58) Field of Classification Search
    CPC ................................ H04L 67/26; H04L 67/32
    USPC ........................................................ 709/206
    See application file for complete search history.

(56) References Cited

U.S. PATENT DOCUMENTS

| 10,187,486 | B1* | 1/2019 | Toksoz ................. H04L 67/26 |
| 2017/0244798 | A1* | 8/2017 | DeLuca ................. H04L 67/26 |
| 2017/0295257 | A1* | 10/2017 | Bao ...................... H04L 67/34 |
| 2018/0097764 | A1 | 4/2018 | Lutsenko et al. |
| 2019/0028413 | A1* | 1/2019 | Lewis .................... H04L 51/06 |

OTHER PUBLICATIONS

Office Action issued in U.S. Appl. No. 16/445,812 dated Aug. 19, 2019.

* cited by examiner

*Primary Examiner* — Glenford J Madamba
(74) *Attorney, Agent, or Firm* — FisherBroyles, LLP

(57) ABSTRACT

Systems and methods for causing an in-application message to be presented to a user of a software application can send message data to the software application via a push notification and via a redundant communication sent over a data network. If the push notification is delivered to the software application first, information in the push notification is used to present the in-application message to the user and the later arriving redundant communication over the data network is ignored. Similarly, if the redundant communication via the data network arrives first, information in that communication is used to present the in-application message to the user, and the later arriving push notification is ignored.

15 Claims, 9 Drawing Sheets

SYSTEMS AND METHODS FOR ENSURING PRESENTATION OF IN-APPLICATION MESSAGES

BACKGROUND OF THE INVENTION

The invention is related to systems and methods for enhancing customer engagement. In part, this is accomplished by sending messages to users. The messages could be mobile or browser-based push notifications, text (SMS/MMS) messages, email messages, in-application messages, or an audio recording that is sent to users via a telephony system. The present invention is focused on reliably delivering in-application messages to users.

Companies also often hire a customer engagement service to help manage the delivery messages to their customers. The customer engagement service can cause messages to be delivered to customers at opportune times when the messaging may have the most influence over customer behavior. Similarly, the customer engagement service may know when certain types of message will have the greatest value to customers, and then seek to deliver the messages at those times.

Companies often provide a software application to their customers that the customers install on a computing device such as a laptop computer, a desktop computer, a tablet or a smartphone. The software applications can provide a wide array of functionality or information to customers depending on what types of goods and services the company provides to its customers. For example, an online retailer may provide its customers with a software application that makes it easy for customers to make online purchases. A media company may provide its customers with a software application that makes it easy for the customers to access and watch media content.

Regardless of the type of software application that a company provides to its customers, it is often possible to deliver messages to the customers via the software application while they are using the company's software application. Such messages are referred to as in-application or "in-app" messages.

A customer engagement service hired by a company can control the flow and timing of the delivery of in-app messages. Indeed, the customer engagement service may deliberately coordinate the in-app messages with the delivery of messages sent to the customers via alternate delivery channels to help improve the customers' overall experience.

One way that a customer engagement service can cause an in-application message to be delivered to a user is to send a push notification with message information to the user's computing device. The push notification is designed to be delivered to a company's software application resident on the user's computing device. The push notification may also include information identifying the message that is to be presented to the user, or information that the software application can use to generate a message that is then presented to the user.

Push notifications are actually delivered to user computing devices via push notification services. While push notification services reliably and timely deliver push notifications to user devices in many parts of the world, in some geographical regions the delivery of push notifications to user computing devices is less reliable. In some instances, this unreliability may occur because of the physical infrastructure in those geographical regions. In other instances, government regulations or government interference can cause unreliability in the delivery of push notifications. Regardless of the reasons, it is common in some geographical regions for the delivery of push notifications to be significantly delayed, and/or for the delivery of some push notifications to fail completely.

When a push notification containing message data for an in-application message is delayed or lost, the user to which the push notification was sent will get a delayed presentation of an in-application message, or the user may fail to even receive the in-application message. A delayed message or a lost message can significantly interfere with a customer engagement service's effort to orchestrate the timely delivery of messages to users on behalf of client companies.

DETAILED DESCRIPTION OF PREFERRED EMBODIMENTS

Figure 1:
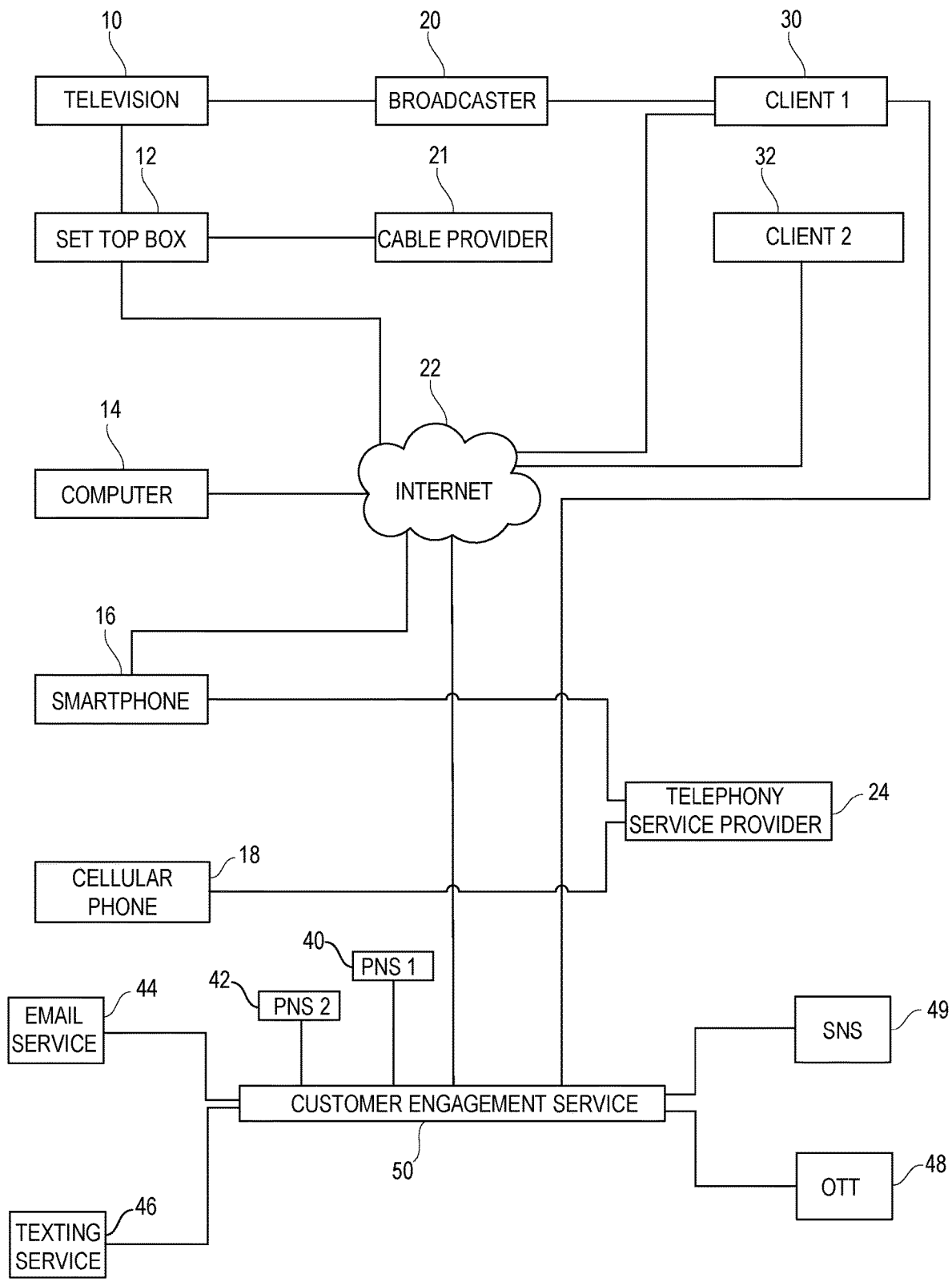
FIG. 1 is a diagram of a communications environment which could be utilized by systems and methods embodying the invention.

The following detailed description of preferred embodiments refers to the accompanying drawings, which illustrate specific embodiments of the invention. Other embodiments having different structures and operations do not depart from the scope of the present invention.

Systems and methods embodying the invention can be part of a customer engagement service. As mentioned above, a customer engagement service helps a company interact with its users to enhance the customer experience and to increase the company's business, revenue and/or stature. One of the ways that a customer engagement service assists a company is by helping the company to manage how and when messages are delivered to the company's customers.

The following description refers to "clients" and to "users". For purposes of this discussion, a "client" would be a client of the customer engagement service. In other words, a company or business that is being assisted by the customer engagement service. "Users" are a client's users, not users of the customer engagement service. The customer engagement service sits between a client and the client's users to manage and orchestrate the delivery of messages sent from the client to its users.

A "message" could take many different forms and be delivered to a user in many different ways. For example, a "message" could be a mobile or browser-based push notification sent to users by a push notification service.

A message could also be an in-app message that is delivered to a user via a client's software application. The client's software application could be resident on a user's computer, a user's smartphone or any other device with a processor that is capable of running such a software application. The in-app messages generated and/or delivered by such a software application could be received by the user in various ways.

Also, a client's software application could be instructed to present an in-app message to a user in various different ways. In some instances, the customer engagement service could have a push notification service deliver a push notification to a user's computing device, where the push notification is configured to be delivered to the client's software application on the user computing device. The push notification could include information that instructs the software application to deliver a certain in-app message to the user. Also, information in the push notification could be used by the software application to generate an in-app message that is then presented to the user, and also to schedule when the in-app message is presented to the user.

In other instances, the customer engagement service could send a communication to a software application on the user's computing device via a data network, such as the Internet. The communication could include message data that instructs the software application to deliver a certain in-app message to the user. Also, information in the communication sent to the software application via the data network could be used by the software application to generate an in-app message that is then presented to the user, and also to schedule when the in-app message is presented to the user.

A message also could be a text message (SMS/MMS) that is delivered to users via a smartphone or via a text messaging software application. A message also could be a message delivered to a user via a social media service, or via an Over The Top (OTT) messaging service. A message also could be an email message that is delivered to users via standard email service providers. Moreover, a message could be an audio message delivered to a user via a telephony or VOIP service provider, or a video message delivered via similar means.

For purposes of the following description and the appended claims, any reference to sending a "message" to users is intended to encompass any of the different types of messages and delivery channels mentioned above, as well as any message types and delivery means that are developed in the future. That said, the following description focuses on in-app messages that are delivered to a user via a client's software application.

FIG. 1 illustrates a communications environment in which systems and methods embodying the invention could be practiced. As shown in FIG. 1, the communications environment includes client one 30, client two 32 and the customer engagement service 50. Client one 30 and client two 32 are clients of the customer engagement service 50. The clients 30/32 can communicate with the customer engagement service directly, via the Internet 22, or via other means.

Users of the clients 30/32 could utilize the clients' 30/32 services in various ways. For example, if client one 30 is a media company that provides media content to its users, client one 30 could produce media content that is sent via a broadcaster 20 to a client's television 10. That media content could be delivered to the user's television 10 via a set top box 12 that is connected to the user's television and to the Internet 22 and/or a cable service provider 21. In some instances, a software application on the set top box 12 that is provided by client one 30 could be used to deliver the content to the user's television 10.

The same or a different user might have a computer 14 that is connected to the Internet 22. The user could utilize a web browser on the computer 14 to access an Internet website provided by client one 30 that also offers media content. Similarly, a software application provided by client one 30 and that is resident on the user's computer 14 might also be used to access media content provided by client one 30 via the Internet 22.

Yet another user may have a smartphone 16 that is capable of communicating over the Internet 22 and/or via a telephony service provider 24. A software application provided by client one 30 and that is resident on the user's smartphone 16 could be used to access media content provided by client one 30 via the Internet 22 or via the telephony service provider 24.

Still another user might have a cellular telephone 18 that is capable of receiving text messages. This would allow the user of the cellular telephone to receive text messages from client one 30.

FIG. 1 also shows that a first push notification service (PNS) 40 and a second push notification service 42 could be used by the customer engagement service 50 to deliver push notifications to smartphones and/or web browsers. Such messages could be delivered by the push notification services 40/42 to user smartphones via the Internet 22 or via a telephony service provider 24 that provides user smartphone with its native telephony service.

FIG. 1 also shows that an email delivery service 44 could be used by the customer engagement service 50 to send email messages to users. Further, the customer engagement service 50 could use a text messaging service 46 to send text messages to users, or an OTT messaging service 48 to send formatted messages to users. Moreover, the customer engagement service 50 might send a message to users via one or more social networking services 49. Of course, the customer engagement service 50 could utilize any other message delivery service as well to communicate messages to users.

The clients 30/32 in this communications environment could be any sort of client that utilizes a customer engagement service 50 to help them manage engagement with their users. As noted above, a client could be a media broadcaster that produces and sends media content to its users. In other instances, a client could be a retailer whose purchasers are its users. In still other instances, the client could be a service provider, such as a telephony service provider or an Internet service provider. Virtually any business that wishes to send messages to its users could be a client in this environment.

One of skill in the art will appreciate that FIG. 1 only illustrates a very limited number of devices that would be used by users to receive messages from a client, and that could be used to interact with a client. In reality, there would be a very large number of user devices in such a communications environment. Also, a single user could possess and use multiple devices to access a client's services and to receive messages from a client. Thus, the depiction in FIG. 1 should in no way be considered limiting.

Figure 2:
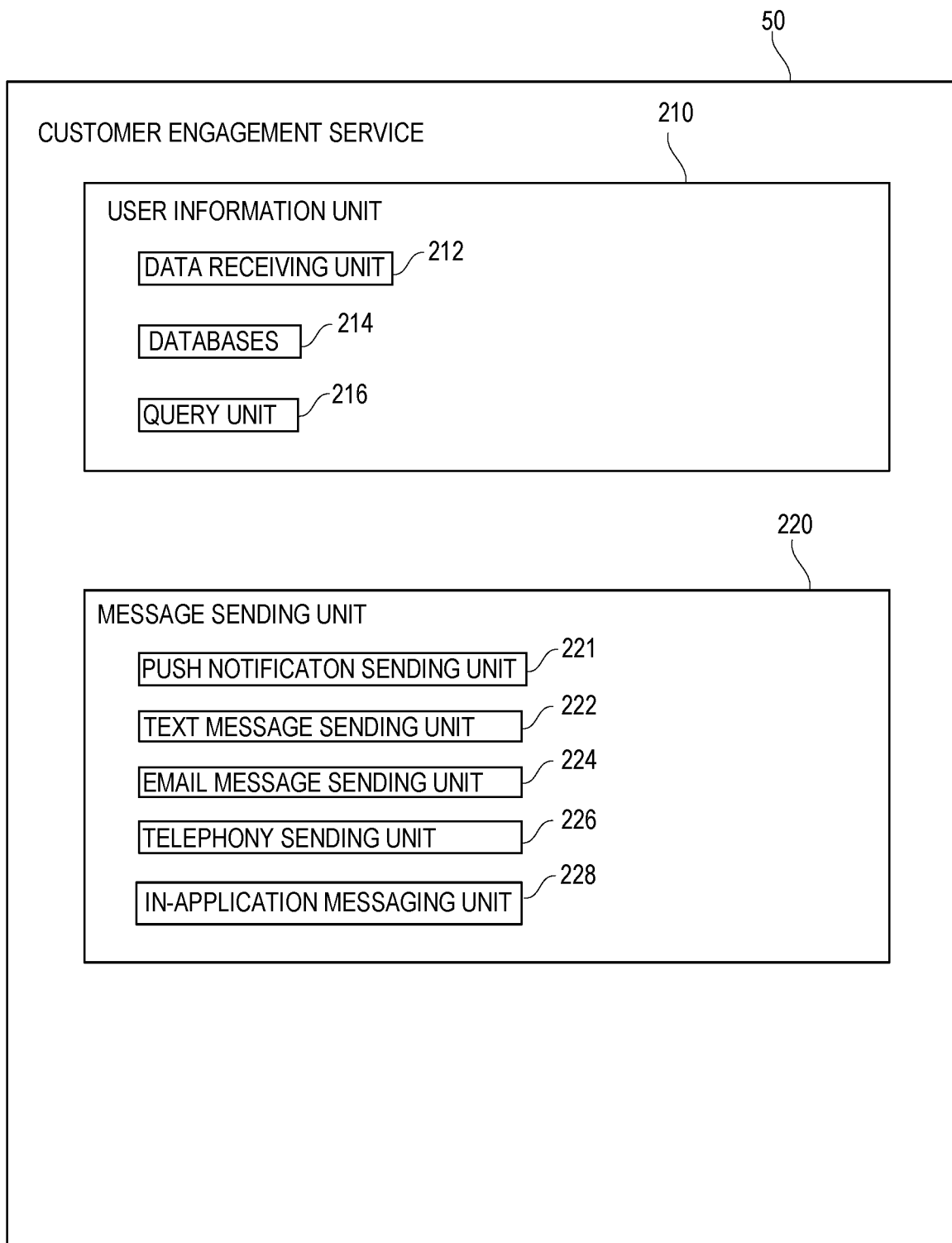
FIG. 2 is a diagram of selected elements of a customer engagement service.

FIG. 2 illustrates selected elements of a customer engagement service 50. The illustration in FIG. 2 is in no way intended to show all elements of a typical customer engagement service 50, and indeed there would typically be many other elements. Likewise, a customer engagement service 50 embodying the invention might not have all the elements illustrated in FIG. 2.

The customer engagement service 50 includes a user information unit 210 that is responsible for receiving and storing information about a client's users, and that is responsible for responding to requests for that stored information. The user information unit 210 includes a data receiving unit 212 that receives various items of information about users, and that stores that received information in databases 214. The information could be received from various sources. However, typically a client would provide information about its users to the data receiving unit 212 via various means.

For example, in some instances a client may send notifications to the data receiving unit 212 each time that one of the client's users engages with the client in some fashion. For example, if the client is an online retailer, each time that a user makes a purchase from the online retailer, the online retailer could send the data about the purchase made by that user to the data receiving unit 212.

In another example, if the client is a media broadcaster, and one of the media broadcaster's users logs onto a website provided by the media broadcaster to access media content, the media broadcaster could send data about that contact to the data receiving unit 212. The data sent could include an identification of the user, the time that the user accessed the website and an indication of what the user accessed or watched while logged into the website. Similarly, any time that a user accesses a client's website, the client could automatically report that user activity to the data receiving unit 212 of the customer engagement service 50.

In yet another example where the client is a media broadcaster, the media broadcaster could have provided a software application to a user that the user has loaded onto a smartphone or a computing device. The software application could be configured to report the actions that a user takes when using the software application directly to the data receiving unit 212 of a customer engagement service 50. Indeed, in any instance where the client has provided a software application to its users, the software application could be configured to report user activity to the data receiving unit 212 of the customer engagement service 50.

Because clients and software applications that the clients provide to their users all report user activity to the customer engagement service 50, the customer engagement service 50 is able to build a detailed picture of each user, the user's preferences, and the user's typical courses of action.

In addition, because the customer engagement service 50 is tasked by its client with the delivery of messages to the client's users, the customer engagement service 50 is also able to build up a record of how and when individual users react to a sent message. This could include an indication of when a user opens a sent message after delivery, and whether and when the user takes an action in response to receipt of a message. For example, because the data receiving unit 212 is also receiving information from the client regarding user contacts with the client, the customer engagement service 50 may learn that shortly after an individual user received a message from the client, the user logged into the client's website. Or that shortly after the user received a message, the user opened a software application provided by the client. For all these reasons, the customer engagement service 50 is able to build detailed user profiles that can be used to predict how individual users will act in certain situations, or how they will respond to certain forms of messaging.

As shown in FIG. 2, the user information unit 210 also includes a query unit 216. The query unit 216 queries the databases 214 to obtain various items of information about the users.

The customer engagement service 50 also includes a message sending unit 220. The message sending unit 220 is responsible for sending messages to a client's users. As explained above, messages could take many different forms and have many different delivery channels. The message sending unit 220 includes a push notification sending unit 221 that causes mobile or browser-based push notifications to be sent to user computing devices via one or more push notification services 40/42, as illustrated in FIG. 1. The push notification sending unit 221 may obtain telephone numbers and push notification service credentials for individual users from the databases 214 with the assistance of the query unit 216. Alternatively, the client may provide that information to the message sending unit 220. The user credential information is then used to cause one or more push notification services 40/42 to deliver a push notification to a user computing device.

The message sending unit 210 may also include a text message sending unit 222 that causes text-based messages to be sent to users. The text-based messages could be traditional SMS/MMS messages, or messages that are delivered to users via an OTT messaging service or perhaps a social networking service. Information needed to send such text-based messages to users may also be obtained from the databases 214 of the user information unit 210, or that information may be provided by the client. Here again, the message sending unit can enlist the services of one or more text-based message delivery platforms to actually send the message to users.

The message sending unit 220 may also include an email message sending unit 224 that causes email messages to be sent to users. The email message sending unit 224 may obtain email addresses and other information, such as user names, for individual users from the databases 214 with the assistance of the query unit 216, or that information may be provided by the client. The information is then used to send email messages to users. The email messages may be delivered to users by one or more third party email services.

The message sending unit 220 may also include a telephony sending unit 226 that is responsible for delivering audio messages to users via a telephony system. For example, the telephony sending unit 226 could generate an audio recording of a message that is to be delivered to users, or the telephony sending unit 226 could receive such an audio message directly from the client. The telephony sending unit 226 would then obtain information about individual customers from the databases 214 with the assistance of the query unit 216, such as user telephone numbers and user names, or that information could be provided by the client. The telephony sending unit 226 would then enlist the aid of an outside service to deliver the audio message to users via a traditional or VOIP telephony system.

In some instances, the telephony sending unit 226 could generate and operate interactive voice response (IVR) applications to deliver such audio messages to users. Doing so may allow a user to request and receive information or services in addition to the original audio message. If a user does interact with an IVR application, how the user interacts with the IVR application could also be recorded in the databases 214 as additional information about the user.

The message sending unit 220 further includes an in-application messaging unit 228. The in-application messaging unit 228 is responsible for causing messages to be delivered to a user via a client's software application that it provides to its users. For this reason, the in-application messaging unit 228 can interact with an instantiation of a client's software application that is resident on a user's computing device, as will be explained in detail below.

Figure 3:
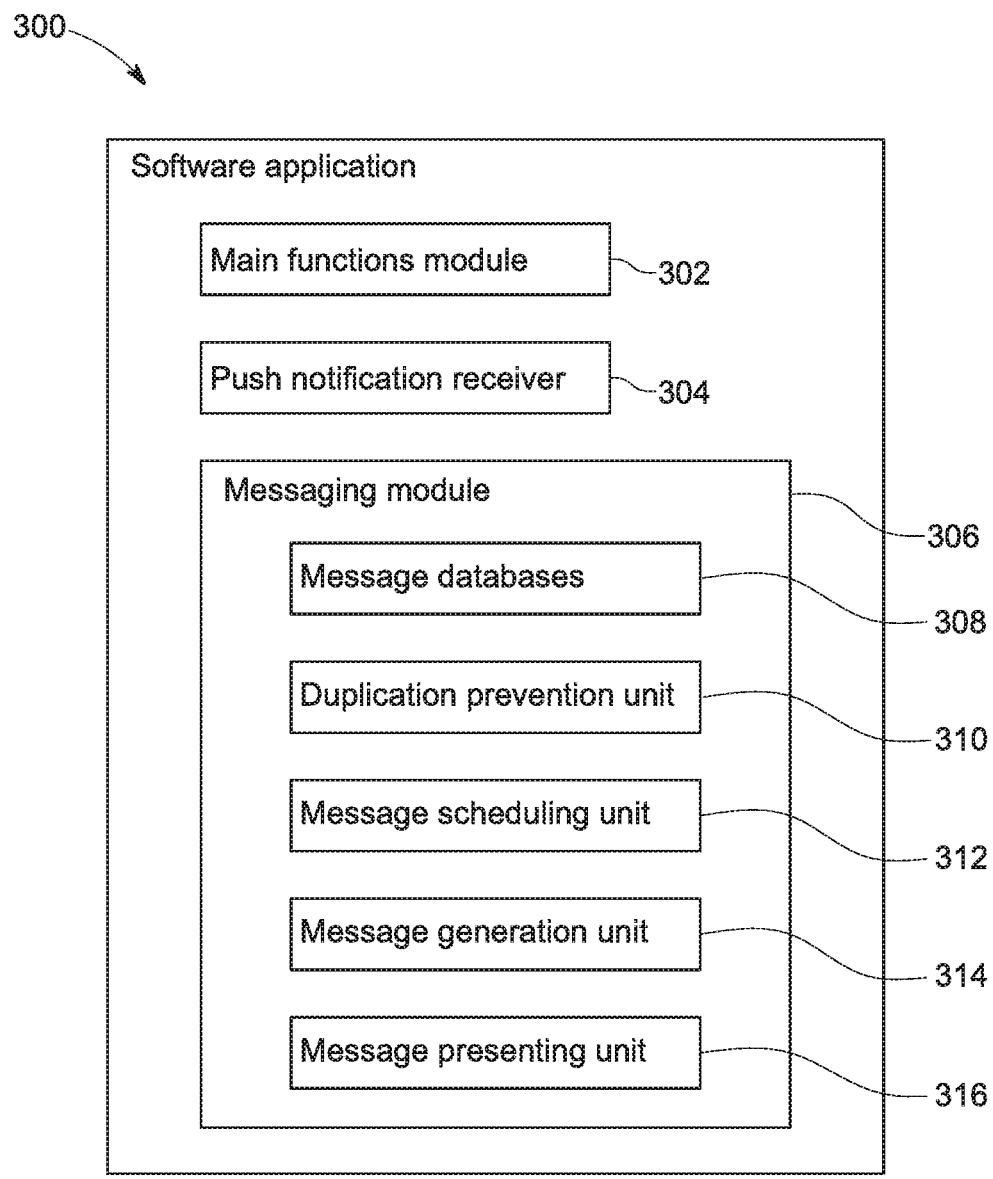
FIG. 3 is a diagram illustrating various elements of a company's software application that is provided to the company's customers.

FIG. 3 illustrates selected elements of a client's software application that would be provided to the client's customers or users. The software application 300 includes a main functions unit 302, which provides one or more functions to the user. The actual function(s) would vary greatly from client to client. For example, if the client is an online retailer, the main functions unit 302 could be configured to allow a user to make online purchases. If the client was a media company, the main functions unit 302 could provide the user with a way of accessing and watching media content provided by the client.

The software application 300 also includes a push notification receiver 304. When the push notification sending unit 221 of a customer engagement service causes a push notification service 40/42 to send a push notification to a user's computing device, the push notification can include information that indicates that the push notification is to be delivered to a specific software application resident on the user's computing device. The push notification itself, or information extracted from the push notification, is provided to the push notification receiver 304 of the software application. The push notification can be a silent push notification that is not seen by the user, and which only delivers information and instructions to the software application.

The software application 300 also includes a messaging module 306 that is responsible for presenting in-application messages to a user. The messaging module 306 can include message databases 308. The message databases 308 can store pre-configured messages, and/or message templates that can be filled with information to generate in-app messages. The message databases 308 may also store information that indicates which messages have already been presented to the user, and when those messages were presented to the user. The message databases 308 may also include information that can be inserted into a message template to generate an in-application message that is to be presented to the user. For example, the message databases 308 may include various items of information about the user which can be used to personalize an in-application message that is to be presented to the user.

The messaging module 306 also includes a duplication prevention unit 310. As will be explained below, information instructing the messaging module 306 of a software application 300 to present a user with an in-application message may be delivered to the messaging module 306 via redundant paths. The duplication prevention unit 310 prevents the messaging module 306 from presenting the same message to the user twice—once when a first instruction to present the message arrives via a first path, and a second time when redundant instructions to present the message arrive via a second path. The duplication prevention unit 310 may use information in the message databases 308 about which messages have already been presented to the user to accomplish its task.

Information in the push notifications or message data received by the software application can be used to prevent duplicate messages from being presented to the user. For example, an identification number or code associated with a particular message can be sent along with the message data, regardless of the path used to deliver the message data to the software application. When an identification number or code is assigned to the message data for a particular message, the duplication prevention unit 310 can easily determine when the same message data is received first via a push notification, and later via a data network, or vice versa. The first time that the message data is received, it can be used to present the message to the user. The second time the message data is received, it can be ignored.

While an identification number or code can be assigned to message data for a particular message for purposes of preventing duplication of messages, information in the message data itself could also be used for this purpose. For example, a combination of the title and header of the message data could be used by the duplication prevention unit 310 to identify duplicate receipt of the same message data.

The messaging module 306 also includes a message scheduling unit 312. In some instances, instructions to present the user with an in-application message may indicate that the in-application message is to be presented to the user immediately. In other instances, an instruction to present an in-application message to a user may specify that the message is to be presented to the user at a specific time in the future, or perhaps upon the occurrence of a triggering event. Information about when to present an in-application message may be stored in the message databases 308. The message scheduling unit 312 then uses such scheduling information to cause the message presenting unit 316 to present the in-application message to the user at the appropriate time.

Information about when to present in-application messages may apply to only one message, or such scheduling information could apply to multiple in-application messages. For example, scheduling information used by the message scheduling unit 312 may indicate that multiple in-application messages are to be presented to the user at a specific time. Alternatively, scheduling information could indicate that at a specified time the message presenting unit 316 is to present the user with any in-application messages for which message instructions have accumulated prior to that time, and which have not already been presented to the user. In still other instances, the scheduling information could specify that a series of related messages are to be presented to the user at different predetermined times over the coming hours, days or weeks.

The messaging module 306 further includes a message generation unit 314 which generates in-application messages that are to be presented to the user. The message generation unit 314 may generate an in-application message by obtaining and inserting items of information into a message template. The message template may be stored in the message databases 308, or elsewhere, or the message template may be provided to the messaging module 306 along with instructions to generate and present the in-application message to the user. The information that the message generation unit 314 inserts into a message template could be obtained from the message databases 308, from elements of a customer engagement service 50, from the client that provided the user with the software application 300 or from other third-party sources. In other instances, the message generation unit 314 may obtain specific instructions about how to generate an in-application message, and about what information to include in an in-application message, as part of the received instructions to present the in-application message to the user.

The messaging module 306 also includes a message presenting unit 316 that is responsible for presenting the user with an in-application message. This could include displaying a text or graphical in-application message to a user, playing an audio in-application message to a user or playing a video in-application message to the user. The in-application message may be interactive in nature, meaning that the message presenting unit 316 may operate similar to an interactive voice response system to deliver an in-application message to a user.

With the foregoing as background, we will now turn to a description of various methods embodying the invention. These methods are intended to overcome or mitigate the problems that can occur when a push notification with instructions to present a user with an in-application message is delayed or fails to arrive altogether. Inherent in these methods is that an instruction to present a user with an in-application message will be sent from a server to a software application on a user computing device. The software application on the user computing device then responds to those instructions by presenting the user with one or more in-application messages at an appropriate time. The server that issues an instruction to present a user with an in-application message may be one that is controlled by a customer engagement service. For example, the server may be a part of the in-application messaging unit 228 of a customer engagement service 50. Alternatively, the server may be one that is controlled by a company or business that is a client of a customer engagement service.

Figure 4:
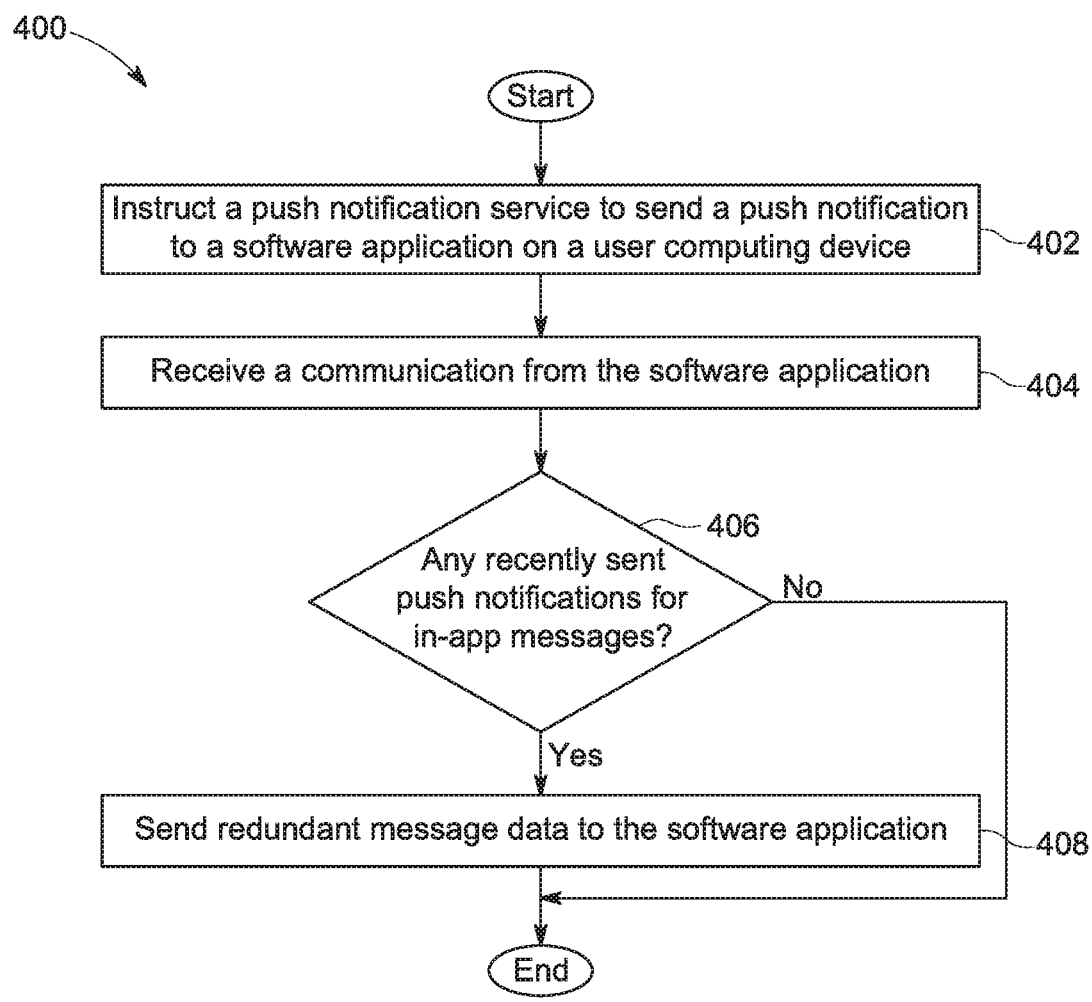
FIG. 4 is a flowchart illustrating steps of a first method embodying the invention that would be performed by a server.
Figure 5:
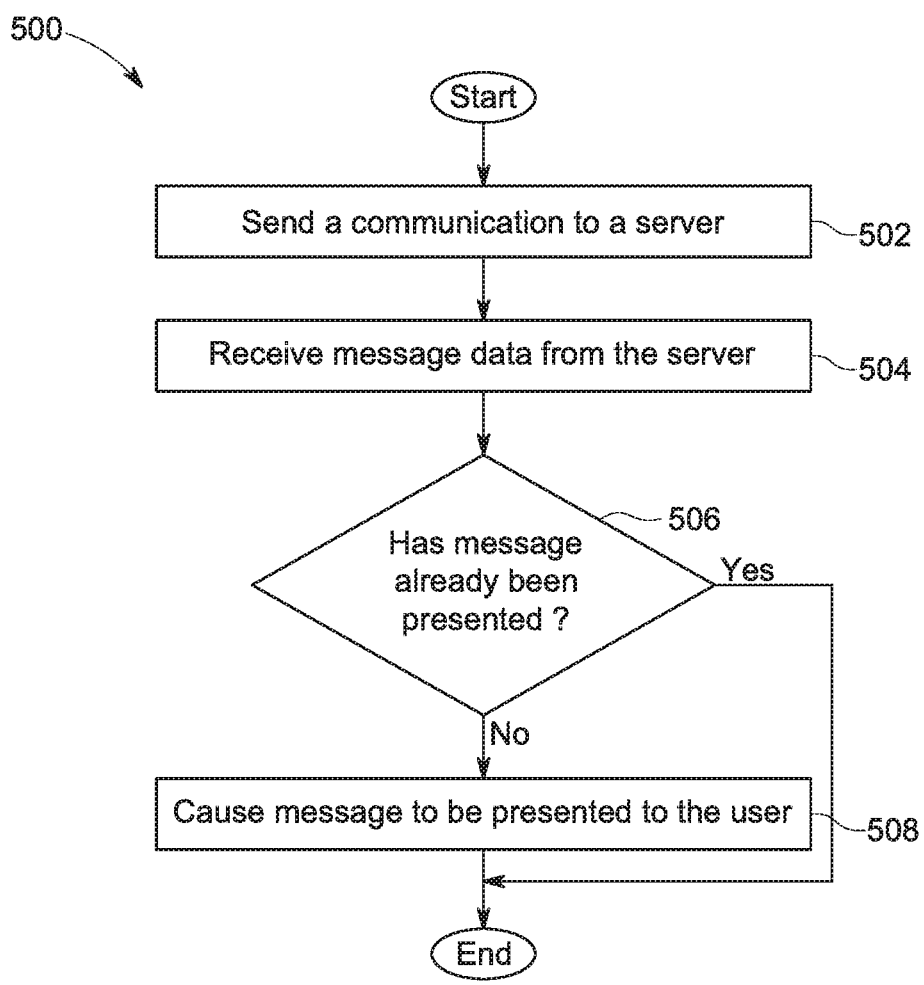
FIG. 5 is a flowchart illustrating steps of another method embodying the invention that would be performed by a software application.

FIG. 4 is a flowchart that illustrates actions that would be performed by a server as part of a first approach embodying the invention for causing one or more in-application messages to be presented to a user. FIG. 5 is a flowchart illustrating actions that would be performed by elements of a company's software application that is resident on a user's computing device as part of this first approach. Because these actions overlap in time, a description of this first approach will make references to both FIG. 4 and FIG. 5.

This first approach to causing one or more in-application messages to be presented to a user starts when a server begins to perform the method 400 illustrated in FIG. 4. The method 400 begins and proceeds to step 402, where a server causes a push notification to be sent to a software application on a user's computing device. The server could be acting as the push notification sending unit 221 of a customer engagement service, which is acting upon instructions received from an in-application messaging unit 228 of the customer engagement service 50. Alternatively, the server could be part of a company that provided the user with the software application, and which is a client of a customer engagement service.

Regardless of the identity of the server, the server is not itself sending the push notification. Instead, a separate push notification service 40/42 is responsible for actually sending the push notification to the user's computing device. The server, however, provides the push notification service 40/42 with various items of information that the push notification service 40/42 uses to configure and send the push notification. That information can include an identity the user's computing device, and information that is to be contained within the push notification.

The information to be included in the push notification includes an instruction to cause one or more in-application messages to be presented to a user, and the instructions are directed to the software application on the user's computing device. The information contained in the push notification may also be used by the software application to generate all or a part of the in-application message. The information provided by the server to the push notification service 40/42 may also identify the software application to which the push notification is to be delivered. That information can be included in the push notification so that an operating system on the user's computing device knows how to route the push notification when it arrives on the user's computing device.

For purposes of this explanation, we will assume that delivery of the push notification is significantly delayed. Before the push notification is actually delivered to the user's computing device, the software application sends a communication to the server. Thus, the method 500 illustrated in FIG. 5 would begin and proceed to step 502 where the software application 300 sends a communication to the server. This communication could be, for example, a registration request that is sent to the server over a data network, such as the Internet. Of course, the communication could be some other type of communication.

In step 404 of the method illustrated in FIG. 4, the server would receive the communication from the software application 300. In step 406, the server would then check to determine if the server had recently requested that one or more push notifications be sent to the software application with instructions to present an in-application message to a user of the software application. The check performed in step 406 may be time limited in some fashion. For example, the check could be performed to identify any push notification requests that were sent during the last five minutes, or perhaps over the last few hours.

The time window used for the check performed in step 406 may vary based on the identity of the user of the software application or based on the geographical area in which the user's computing device is located. For example, if the user's computing device is located in the United States, the time window could be relatively short, such as just a few minutes, in recognition of the fact that push notifications are usually rapidly delivered to user computing devices located in the United States. However, if the user's computing device is located in a geographical area where the delivery of push notifications is often significantly delayed, the time window for the check performed in step 406 could be much larger, perhaps as much as many hours, or even a full day.

If the check performed in step 406 determines that the server did request that one or more push notifications be sent to the user's computing device within the predetermined time window, with instructions to cause a push notification to be presented to the user, the method proceeds to step 408. In step 408, the server sends message data to the software application that will enable the software application on the user's computing device to present the same in-application message or messages to the user that any push notifications sent within the predetermined time window would have caused the software application to present to the user. Thus, the message data sent to the software application in step 408 essentially duplicates the in-application messaging instructions that the server attempted to send to the software application via any push notifications sent within the predetermined time window. The method performed by the server would then end.

Similarly, if the check performed in step 406 determined that the server had not requested that any push notifications be sent to the software application within the predetermined time window, with instructions to cause an in-application message to be presented to the user, the method ends.

For purposes of this explanation we will assume that the server sends redundant message data to the software application in step 408 of the method illustrated in FIG. 4. If that occurs, the message data is received by the software application in step 504 of the method illustrated in FIG. 5. The software application then performs a check in step 506 to determine if the message data received in step 504 instructs the software application to present the user with an in-application message that the software application has already presented to the user. The duplication prevention unit 310 of the software application 300 performs this check. As noted above, the duplication prevention unit 310 can use information in the message data such as a message identification number or code and/or information in the messaging databases 308 that indicates which in-application messages have been presented to the user to make the check in step 506. Alternatively, the message data received in step 504 could refer back to specific push notifications that the server requested be sent to the software application. In that instance, the duplication prevention unit 310 may check to see if those push notifications have already been received and used to cause in-application messages to be presented to the user.

If the check performed in step 506 indicates that all of the in-application messages identified in the message data received in step 504 have already been presented to the user, the method ends. If the check performed in step 506 indicates that one or more of the messages identified in the message data received in step 504 have not already been presented to the user, then the method proceeds to step 508. In step 508, the message generation unit 314 generates any in-application messages that have not already been presented to the user based on the message data received in step 504, and the message presenting unit 316 causes those in-application messages to be presented to the user. The method then ends.

The methods illustrated in FIGS. 4 and 5 are a way of sending in-application message presentation instructions to a software application on a user computing device via two redundant paths. As a result, if a push notification bearing in-application message presentation instructions fails to arrive, or is significantly delayed, there is a chance that a communication exchange between the software application and the server that includes another copy of those messaging instructions will cause the software application to present the requested in-application messages.

In some embodiments, the communication sent from the software application to the server in step 502 may instruct the server to send redundant message data to the software application. If that is the case, the software application may specify the time window that is to be used in step 406 of the method illustrated in FIG. 4. This could occur because the software application is aware that it was unable to receive push notifications within the specified time window.

Figure 6:
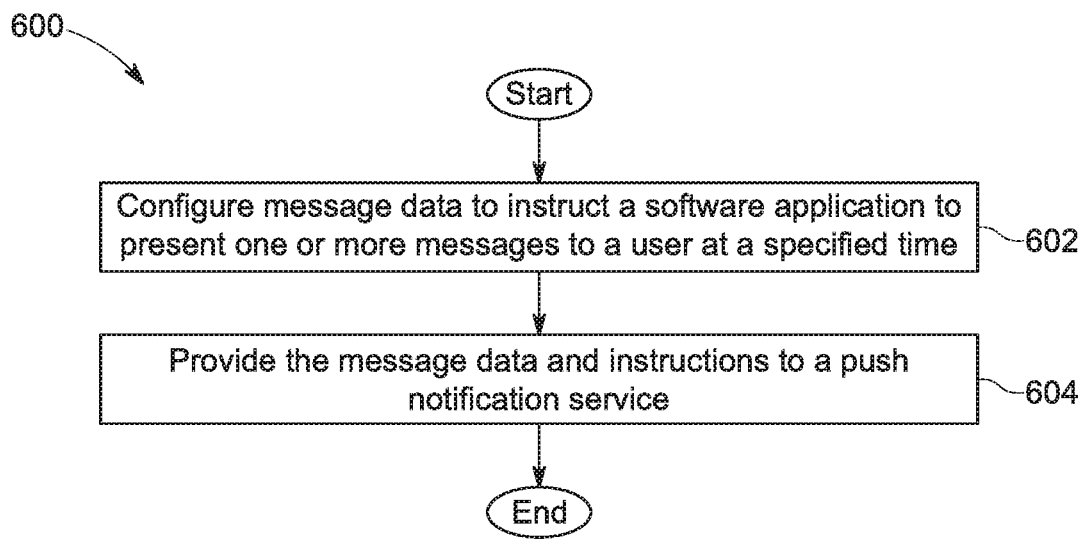
FIG. 6 is a flowchart illustrating steps of another method embodying the invention that would be performed by a server.
Figure 7:
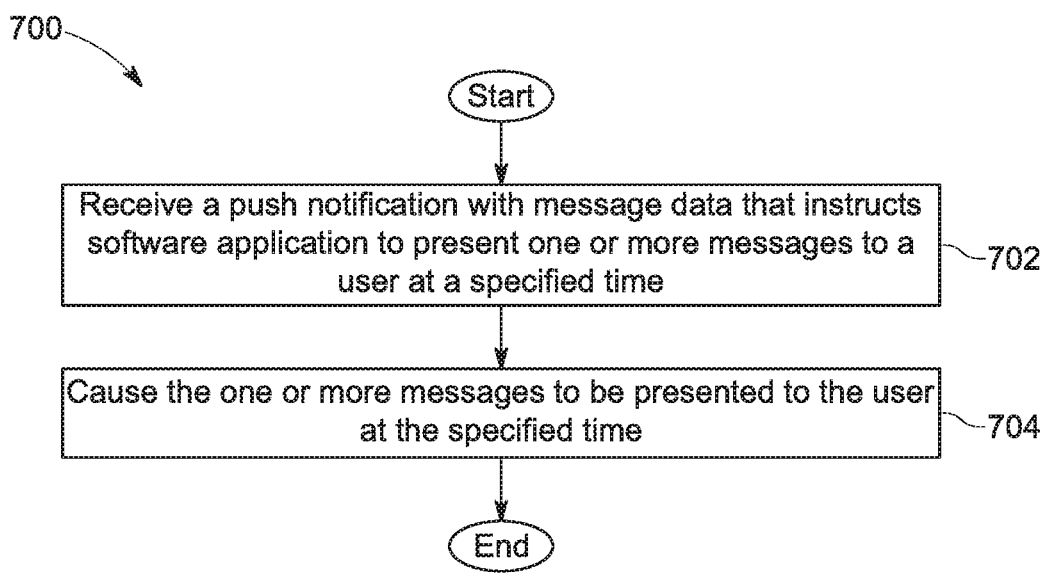
FIG. 7 is a flowchart illustrating steps of another method embodying the invention that would be performed by elements of a software application.

FIGS. 6 and 7 illustrate steps performed by a server and a software application, respectively, according to another approach at addressing the late delivery of push notifications with in-application messaging instructions. In this approach, we are concerned with ensuring that when software applications on multiple user computing devices are instructed to present their users with essentially the same in-application message, that all users are presented with the in-application message at approximately the same time. In this approach, the presentation of the in-application message is scheduled so as to allow sufficient time for push notifications bearing message presentation instructions to arrive at most or all of the user computing devices before the scheduled message presentation time.

This approach begins with the method 600 illustrated in FIG. 6, which is performed by a server. As before, the server could be acting as the in-application messaging unit 228 and/or the push notification sending unit 221 of a customer engagement service 50. The method 600 begins and proceeds to step 602 where the in-application messaging unit 228 configures message data that is to be inserted into a push notification message that is to be sent to multiple user computing devices. The message data will instruct a software application on a user's computing device to present an in-application message to a user of the computing device at a specified time.

The method then proceeds to step 604, where a push notification sending unit 221 provides the message data to a push notification service 40/42, along with instructions to send push notifications containing the message data to a plurality of user computing devices. The method then ends.

The message illustrated in FIG. 7, which is performed by a software application on a user computing device, begins when the push notification service 40/42 sends the requested push notification to a user computing device. The method 700 begins and proceeds to step 702, where a push notification receiver 304 of the software application receives the push notification, or data that has been extracted from the push notification. The push notification receiver 304 then provides the message data from the push notification to the messaging module 306 of the software application.

Next, in step 704, the message generation unit 314 uses the message data from the push notification to generate an in-application message. The message scheduling unit 312 uses information about when to present the in-application message to the user, which is also included in the message data of the push notification, to cause the message presenting unit 316 to present the in-application message to the user at the specified time. The method then ends.

In the description provided above, only a single in-application message is presented to the user. In alternate embodiments, the message data included in the push notification could instruct the software application to present multiple in-application messages to the user at the specified time. In still other embodiments, the message data may instruct the software application to present the user with multiple in-application messages at a plurality of different times.

In yet other embodiments, a software application could receive multiple push notifications, each with instructions to present the user with a different in-application message at the same time. In that instance, step 704 could involve presenting the user with in-application messages from multiple push notifications at essentially the same time.

The message data that is sent to a software application 300 might also include scheduling information that indicates the message should not be presented to the user after a predetermined time. For example, if the message relates to a time sensitive price reduction that ends at a predetermined time, the message data could indicate that the message should not be presented to the user after that predetermined time. In this way, delayed push notifications will not cause the inappropriate presentation of a message after its information value has expired.

Figure 8:
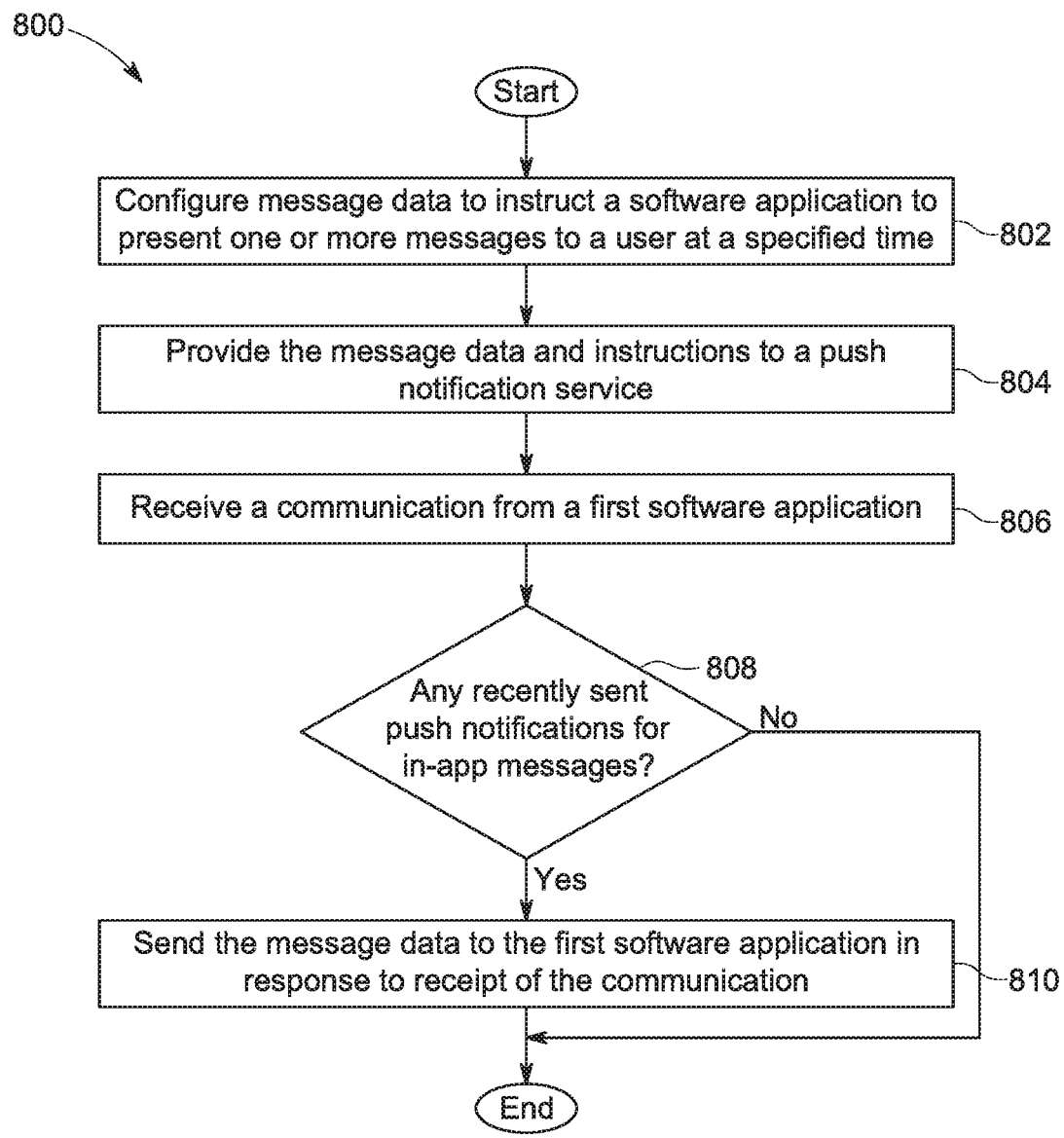
FIG. 8 is a flowchart illustrating steps of another method embodying the invention that would be performed by a server.
Figure 9:
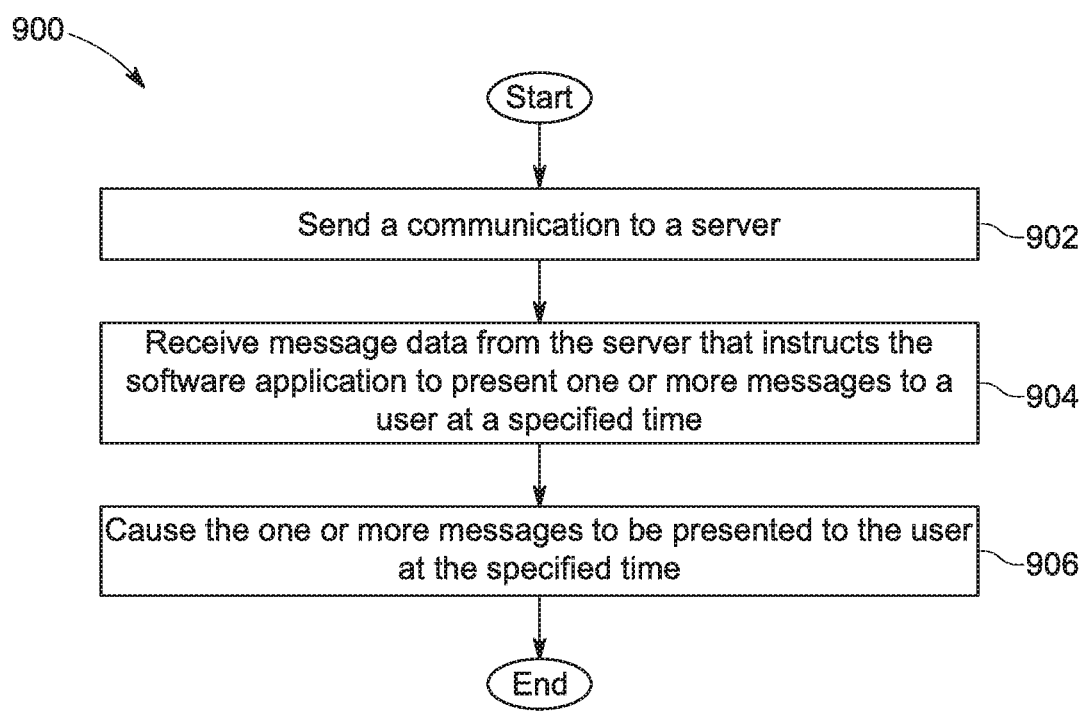
FIG. 9 is a flowchart illustrating steps of another method embodying the invention that would be performed by elements of a software application.

FIGS. 8 and 9 illustrate steps performed by a server and a software application, respectively, according to a third approach. This third approach is a blending of the first and second approaches.

This third approach begins with the method illustrated in FIG. 8, which is performed by a server. As before, the server could be acting as the in-application messaging unit 228 and/or the push notification sending unit 221 of a customer engagement service 50. The method 800 begins and proceeds to step 802 where the in-application messaging unit 228 configures message data that is to be inserted into a push notification message that is to be sent to multiple user computing devices. The message data will instruct a software application on a user's computing device to present one or more in-application messages to a user of the computing device at one or more specified times.

The method then proceeds to step 804, where a push notification sending unit 221 provides the message data to a push notification service 40/42, along with instructions to send push notifications containing the message data to a plurality of user computing devices.

The next thing to occur is for a software application to send a communication to the server in step 902 of the method illustrated in FIG. 9. The communication could be a registration request. The communication may also include a request for any in-application messaging instructions that the server attempted to send to the software application via push notifications during a predetermined time window.

In step 806 of the method illustrated in FIG. 8, the server receives that communication from the software application. In step 808, the server then checks to determine if the server recently requested that one or more push notification be sent to the software application with instructions to present an in-application message to the user. The time window used for this check could be dependent on the identity of the user or the software application or based on the geographical location of the user's computing device. In other embodiments, the time window used for this check may be based on instructions included within the communication sent from the software application.

The method then proceeds to step 810, where the server compiles and sends message presentation instructions to the software application that essentially duplicate any messaging instructions that the server attempted to send to the software application via push notifications in the time window used in step 808. The method illustrated in FIG. 8 then ends.

In step 904 of the method illustrated in FIG. 9, the software application receives any message data sent from the server in step 810 of the method illustrated in FIG. 8. Note, this message data will also include instructions about when to present each of the messages to the user. Next, in step 906, the message generation unit 314 then uses the message data from either push notifications or the message data received directly from the server in step 904 to generate one or more in-application messages. The message scheduling unit 312 uses information about when to present the one or more in-application messages to the user, which is also included in either a push notification or the message data received in step 904, to cause the message presenting unit 316 to present the one or more in-application messages to the user at the specified time(s). The method then ends.

In the methods described above, the software application on a user's computing device prevented duplicate presentations of the same message to the user when the same message data was sent to the software application via two different paths. In some embodiments, this is accomplished by assigning an identification number or code to the message data for a particular message, making it easy for the duplication prevention unit 310 to determine when the same message data is received twice via two different paths. However, additional techniques may also be employed to reduce or eliminate the transmission of the same message data twice via two different paths.

Assume a situation where the message sending unit 221 of a customer engagement service 50 causes message data for a particular message to be sent to a user's software application 300 via a push notification. Then, later in time, the software application 300 registers with the customer engagement service 50 via a data network. In the methods described above, the customer engagement service 50 would then send duplicate message data to the software application 300 via the data network.

In some embodiments, however, the customer engagement service 50 may be capable of determining that the user has already been presented with the message. For example, if the message included a link to a particular website, and the user clinked on that link and interacted with the website, the website operator may report that user interaction to the customer engagement service 50. The receipt of that report from the website operator would inform the customer engagement service 50 that the user must have seen the message.

At the point in time that the customer engagement service 50 receives a registration request from the software application 300, the customer engagement service could first check for the existence of any information that would indicate the user has already seen the message. If such information exists, the customer engagement service need not send the message data a second time via the data network. If no such information exists, the customer engagement service 50 would go ahead and send a second copy of the message data to the software application 300 via a data network in keeping with the methods described above.

The examples discussed above related to presenting the user with an in-application message. However, the message that is being presented to the user might also be a message that is stored in a message tray of the software application 300. The same principles would apply.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object-oriented programming language, such as JavaScript, Java®, Swift or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 10:
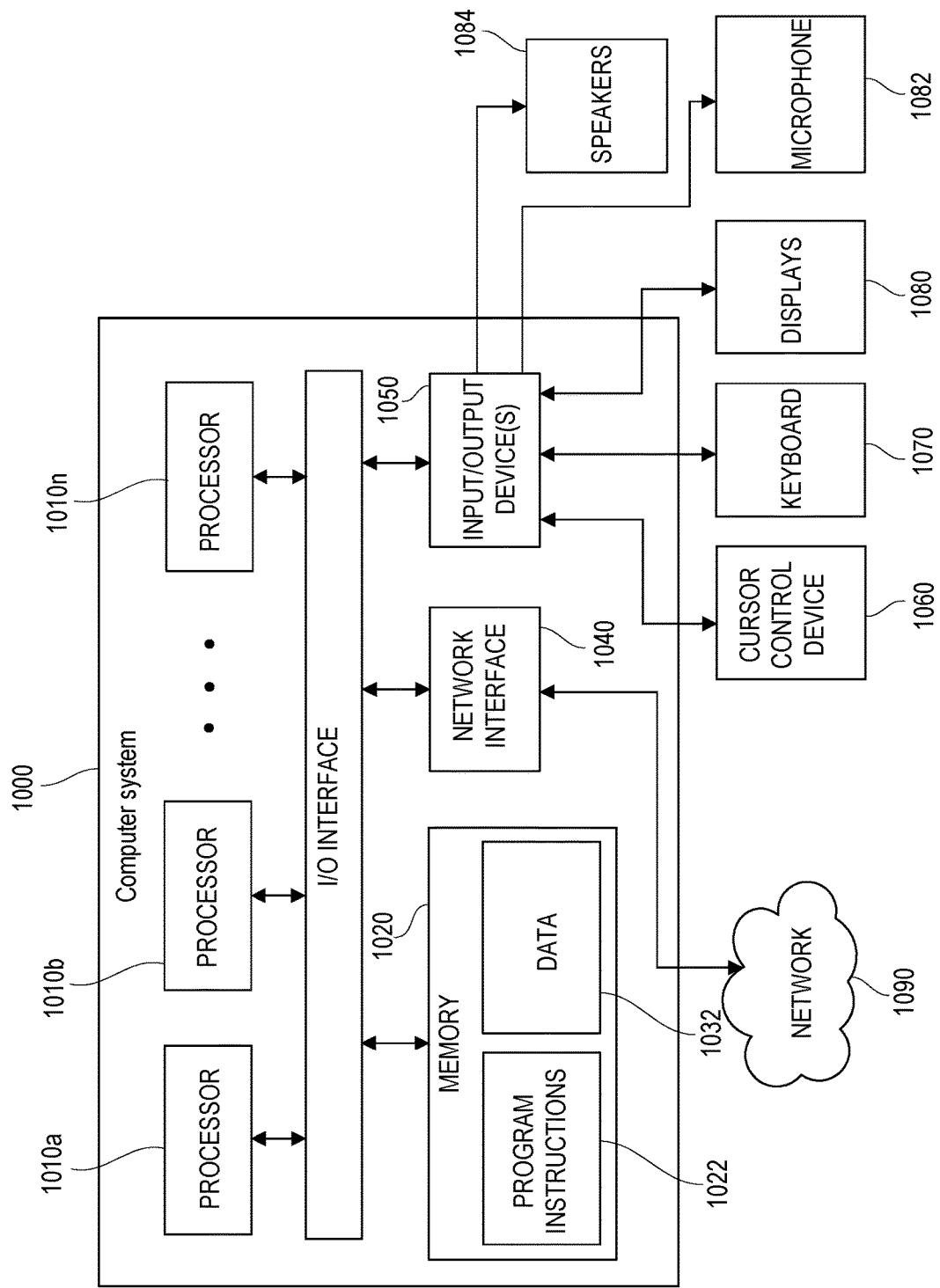
FIG. 10 is a diagram of a computer system and associated peripherals which could embody the invention, or which could be used to practice methods embodying the invention.

FIG. 10 depicts a computer system 1000 that can be utilized in various embodiments of the present invention to implement the invention according to one or more embodiments. The various embodiments as described herein may be executed on one or more computer systems, which may interact with various other devices. One such computer system is the computer system 1000 illustrated in FIG. 10. The computer system 1000 may be configured to implement the methods described above. The computer system 1000 may be used to implement any other system, device, element, functionality or method of the above-described embodiments. In the illustrated embodiments, the computer system 1000 may be configured to implement the disclosed methods as processor-executable executable program instructions 1022 (e.g., program instructions executable by processor(s) 1010) in various embodiments.

In the illustrated embodiment, computer system 1000 includes one or more processors 1010a-1010n coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, display(s) 1080, microphone 1082 and speakers 1084. In various embodiments, any of the components may be utilized by the system to receive user input described above. In various embodiments, a user interface may be generated and displayed on display 1080. In some cases, it is contemplated that embodiments may be implemented using a single instance of computer system 1000, while in other embodiments multiple such systems, or multiple nodes making up computer system 1000, may be configured to host different portions or instances of various embodiments. For example, in one embodiment some elements may be implemented via one or more nodes of computer system 1000 that are distinct from those nodes implementing other elements. In another example, multiple nodes may implement computer system 1000 in a distributed manner.

In different embodiments, the computer system 1000 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs). In multiprocessor systems, each of processors 1010 may commonly, but not necessarily, implement the same ISA.

System memory 1020 may be configured to store program instructions 1022 and/or data 1032 accessible by processor 1010. In various embodiments, system memory 1020 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1020. In other embodiments, program instructions and/or data may be received, sent or stored upon different types of computer-accessible media or on similar media separate from system memory 1020 or computer system 1000.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 1090), such as one or more external systems or between nodes of computer system 1000. In various embodiments, network 1090 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 10000. In some embodiments, similar input/output devices may be separate from computer system 1000 and may interact with one or more nodes of computer system 1000 through a wired or wireless connection, such as over network interface 1040.

In some embodiments, the illustrated computer system may implement any of the operations and methods described above, such as the methods illustrated by the flowcharts of FIGS. 4-9. In other embodiments, different elements and data may be included.

Those skilled in the art will appreciate that the computer system 1000 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method performed by a server for causing a message to be displayed to a user of a computing device, comprising:
   instructing a push notification service to send a push notification to a user's computing device, where the push notification contains instructions that will cause a software application on the user's computing device to present a message to the user of the computing device;
   receiving a communication from the software application on the user's computing device via a data network after the instruction to send a push notification has been sent; and
   sending message data to the software application on the user's computing device via the data network in response to receipt of the communication from the software application, wherein the message data enables the software application on the user's computing device to present the same message to the user that the push notification would cause the software application to present to the user, wherein the message data instructs the software application on the user's computing device to present the message to the user only if the software application has not already received the push notification and presented the message to the user, and wherein the message data also instructs the software application on the user's computing device to ignore the push notification if the push notification is received at the user's computing device after the message data.

2. The method of claim 1, wherein the push notification also includes data that can be used by the software application on the user's computing device to generate the message.

3. The method of claim 1, wherein the communication received from the software application is a registration request.

4. The method of claim 1, wherein the received communication includes a request for the server to send to the software application any message data that the server recently attempted to send to the software application via a push notification.

5. The method of claim 1, further comprising determining, in response to receiving a communication from the software application, whether the server has instructed a push notification service to send a push notification to the user's computing device within a predetermined time window that ends when the server received the communication from the software application, and wherein the step of sending message data to the software application on the user's computing device enables the software application on the user's computing device to present the same message or messages to the user that any push notification sent within the predetermined time window would have caused the software application to present to the user.

6. The method of claim 5, wherein a length of the predetermined time window depends on an identity of the user's computing device.

7. The method of claim 5, wherein a length of the predetermined time window depends on a geographical area in which the user's computing device is located.

8. A system comprising one or more servers for causing a message to be displayed to a user of a computing device, comprising:
  means for instructing a push notification service to send a push notification to a user's computing device, where the push notification contains instructions that will cause a software application on the user's computing device to present a message to the user of the computing device;
  means for receiving a communication from the software application on the user's computing device via a data network after the instruction to send a push notification has been sent; and
  means for sending message data to the software application on the user's computing device via the data network in response to receipt of the communication from the software application, wherein the message data enables the software application on the user's computing device to present the same message to the user that the push notification would cause the software application to present to the user, wherein the message data instructs the software application on the user's computing device to present the message to the user only if the software application has not already received the push notification and presented the message to the user, and wherein the message data also instructs the software application on the user's computing device to ignore the push notification if the push notification is received at the user's computing device after the message data.

9. A system comprising one or more servers for causing a message to be displayed to a user of a computing device, comprising:
  a push notification sending unit that is configured to instruct a push notification service to send a push notification to a user's computing device, where the push notification contains instructions that will cause a software application on the user's computing device to present a message to the user of the computing device;
  a server that receives a communication from the software application on the user's computing device via a data network after the instruction to send a push notification has been sent, and that sends message data to the software application on the user's computing device via the data network in response to receipt of the communication from the software application, wherein the message data enables the software application on the user's computing device to present the same message to the user that the push notification would cause the software application to present to the user, wherein the message data instructs the software application on the user's computing device to present the message to the user only if the software application has not already received the push notification and presented the message to the user, and wherein the message data also instructs the software application on the user's computing device to ignore the push notification if the push notification is received at the user's computing device after the message data.

10. The system of claim 9, wherein the push notification also includes data that can be used by the software application on the user's computing device to generate the message.

11. The system of claim 9, wherein the communication received from the software application is a registration request.

12. The system of claim 9, wherein the received communication includes a request for the server to send to the software application any message data that the server recently attempted to send to the software application via a push notification.

13. The system of claim 9, wherein the server also determines, in response to receiving a communication from the software application, whether the push notification sending unit has instructed a push notification service to send a push notification to the user's computing device within a predetermined time window that ends when the server receives the communication from the software application, and wherein the message data sent to the software application on the user's computing device enables the software application on the user's computing device to present the same message or messages to the user that any push notification sent within the predetermined time window would have caused the software application to present to the user.

14. The system of claim 13, wherein a length of the predetermined time window depends on an identity of the user's computing device.

15. The system of claim 13, wherein a length of the predetermined time window depends on a geographical area in which the user's computing device is located.

* * * * *